US009655345B1

(12) United States Patent
Hill

(10) Patent No.: US 9,655,345 B1
(45) Date of Patent: May 23, 2017

(54) TILTING FEEDER

(71) Applicant: David S. Hill, San Antonio, TX (US)

(72) Inventor: David S. Hill, San Antonio, TX (US)

( * ) Notice: Subject to any disclaimer, the term of this patent is extended or adjusted under 35 U.S.C. 154(b) by 0 days.

(21) Appl. No.: 14/947,928

(22) Filed: Nov. 20, 2015

Related U.S. Application Data

(63) Continuation-in-part of application No. 14/455,092, filed on Aug. 8, 2014, now Pat. No. 9,192,148, which is a continuation of application No. 13/784,392, filed on Mar. 4, 2013, now Pat. No. 8,893,659, which is a continuation-in-part of application No. 13/092,285, filed on Apr. 22, 2011, now Pat. No. 8,387,567.

(60) Provisional application No. 61/326,736, filed on Apr. 22, 2010.

(51) Int. Cl.
*A01K 39/00* (2006.01)
*A01K 39/022* (2006.01)
*A01K 39/02* (2006.01)

(52) U.S. Cl.
CPC ........ *A01K 39/022* (2013.01); *A01K 39/0206* (2013.01)

(58) Field of Classification Search
CPC .............. A01K 39/014; A01K 39/0113; A01K 39/0206; A01K 39/04
USPC ...... 119/72, 57.8, 57.9, 52.3, 429, 430, 464, 119/475, 51.03, 52.2, 56.1, 78
See application file for complete search history.

(56) References Cited

U.S. PATENT DOCUMENTS

| | | | | |
|---|---|---|---|---|
| 3,049,093 A | * | 8/1962 | Oliver .................. | A01K 39/014 119/430 |
| 3,125,069 A | * | 3/1964 | Jacobs ................... | A01K 39/00 119/77 |
| 3,191,579 A | * | 6/1965 | Oliver .................. | A01K 39/014 119/57.8 |
| 3,505,975 A | * | 4/1970 | Nelson, Jr. ............. | A01K 31/14 119/429 |
| 3,788,279 A | * | 1/1974 | Boehland, Jr. ....... | A01K 39/012 119/52.3 |
| 3,948,220 A | * | 4/1976 | Fiedler ................. | A01K 39/014 119/51.03 |
| 3,960,112 A | * | 6/1976 | Tiller ................... | A01K 39/014 119/57.8 |

(Continued)

OTHER PUBLICATIONS

Gardman Wild Bird; Hummingbird Feeder with Nectar 3Pack—Part #:BA05805; http://ozbo.com/507632-Hummingbird-Fdr-W-Nectar-Pack.html BA05805, accessed Sep. 16, 2010.

(Continued)

*Primary Examiner* — Yvonne Abbott-Lewis
(74) *Attorney, Agent, or Firm* — Benavides Law

(57) ABSTRACT

An animal feeder for use in dispensing a feeding solution to hummingbirds or other animals. This may be accomplished by providing an animal feeder having a reservoir containing a feeding solution. The reservoir is connected to a dispenser that dispenses the feeding solution through an opening. The reservoir rotates in response to changes in the weight distribution of the feeder relative to the pivot as the reservoir is emptied of the feeding solution. The rotation of the reservoir maintains the opening in the dispensing member above the level of the feed solution in the reservoir. The reservoir has venting holes to maintain equalize pressure within the reservoir with the outside environment.

14 Claims, 8 Drawing Sheets

(56) References Cited

U.S. PATENT DOCUMENTS

| | | | | |
|---|---|---|---|---|
| 3,990,403 | A * | 11/1976 | Jacobs | A01K 39/00 119/72.5 |
| 4,026,244 | A * | 5/1977 | Salick | A01K 39/012 119/531 |
| D277,703 | S | 2/1985 | Kilham | |
| 4,558,662 | A * | 12/1985 | Peterson | A01K 39/012 119/77 |
| 5,025,753 | A * | 6/1991 | Schneider | A01K 39/0106 119/51.03 |
| 5,255,631 | A * | 10/1993 | Anderson | A01K 39/012 119/52.2 |
| 5,269,259 | A * | 12/1993 | Keeler | A01K 39/01 119/57.9 |
| 5,353,742 | A * | 10/1994 | Mauritz | A01K 39/0206 119/52.2 |
| 5,447,118 | A * | 9/1995 | Huff | A01K 1/0356 119/475 |
| 5,479,881 | A * | 1/1996 | Lush | A01K 39/012 119/57.8 |
| 5,740,759 | A * | 4/1998 | Cummings | A01K 7/02 119/72 |
| 6,050,221 | A * | 4/2000 | Eaton | A01K 39/0113 119/52.3 |
| 6,192,832 | B1 * | 2/2001 | Husnik | A01K 39/0113 119/52.3 |
| 6,390,022 | B1 * | 5/2002 | Eichler | A01K 1/0356 119/464 |
| 6,499,430 | B2 | 12/2002 | Garcia-Lucio et al. | |
| 6,712,236 | B1 | 3/2004 | McGill | |
| 7,093,562 | B2 | 8/2006 | Smothers | |
| 7,156,050 | B2 * | 1/2007 | Scott | A01K 31/14 119/431 |
| 7,185,605 | B1 | 3/2007 | Lush | |
| 7,448,347 | B2 | 11/2008 | Richmond | |
| 7,565,881 | B2 * | 7/2009 | Smothers | A01K 39/012 119/72 |
| 7,748,347 | B2 * | 7/2010 | Richmond | A01K 39/012 119/72 |
| 7,789,040 | B2 * | 9/2010 | Liethen | A01K 39/012 119/57.8 |
| 7,958,845 | B2 * | 6/2011 | Gardner | A01K 1/0356 119/72 |
| 8,001,931 | B2 * | 8/2011 | Deese | A01K 5/0142 119/51.01 |
| 8,146,534 | B1 * | 4/2012 | Robertson | A01K 5/0114 119/61.54 |
| 8,291,861 | B2 * | 10/2012 | Hepp | A01K 39/0113 119/65 |
| 2003/0026164 | A1 | 2/2003 | Klein | |
| 2005/0126503 | A1 | 6/2005 | Fort, II | |
| 2005/0139645 | A1 | 6/2005 | Shean et al. | |
| 2006/0037544 | A1 | 2/2006 | Hunter | |
| 2006/0090707 | A1 | 5/2006 | Donegan | |
| 2009/0188434 | A1 | 7/2009 | McMullen | |
| 2009/0283046 | A1 | 11/2009 | Black | |
| 2010/0192866 | A1 | 8/2010 | McMullen | |
| 2010/0224132 | A1 | 9/2010 | Gauker et al. | |
| 2012/0183642 | A1 | 7/2012 | Olmos | |

OTHER PUBLICATIONS

PETCO; PETCO Hummingbird Nectar; http://www.petco.com/product/14435/PETCO-Hummingbird-Nectar.aspx?cm_mmc=CSEMGooglebase-_-Wild%20Bird-_-PETCO-_-1008307&mr:trackingCode=31791416-8381-DE11-B7F3-0019B9C043EB&mr:referralID=NA, accessed Sep. 16, 2010.
QCV; Hummingbird Nectar Ready-to-Use 2 Liter; http://www.qvc.com/qic/qvcapp.aspx/view.2/app.detail/params.aol_refer.false.tpl.detail.msn_refer.false.item.H177602.ref.GBA?cm_ven=GOOGLEBASE&cm_cat=For%20the%20Home&cm_pla=Outdoor%20Living&cm_ite=H177602, accessed Sep. 16, 2010.
Smithsonian Zoo; Hummingbird Nectar Recipe; http://nationalzoo.si.edu/scbi/migratorybirds/webcam/hummingbird_nectar_recipe.cfm, accessed Sep. 16, 2010.
Kordon LLC—Oasis—Bell Bottles; "Bell Bottle"; http://www.novalek.com/aosis/water_bottles/bell_bottle_8oz.htm, accessed Oct. 4, 2011.
Arcata Pet Supplies; "Oasis Bottle Hamster 8 oz"; http://ww.arcatapet.com/item.cfm?cat=1810, date appearing Mar. 30, 2011.
Wikipedia; "Aseptic processing"; May 14, 2009; Wikipedia.org.
usa hardware.com; "Homestead Traditional Gem Disposable Hummingbird Feeder, 16 Oz Capacity (Case: 6 Units)"; 2009; USA Hardware, Minneapolis MN.
backyard style.com; "Traditional Nectar Gem Hummingbird Feeder", 2009; accessed Apr. 22, 2011.
amazon.com; "Bird Brain 15622 Happy Hummer Window Mounted Hummingbird Feeder—Crackle Glass—Aqua Blue"; http://www.amazon.com/Bird-Brain-15622-Mounted-Hummingbird/dp/B000ZMCTQQ; 2009.
Perky-Pet; "Original Instant Liquid Nectar Concentrate for Hummingbirds"; Perky-Pet Products Co., Denver, Colorado, 2006.
Homestead; "Nectar Gem Reusable Hummingbird Feeder"; Gardner Equipment Company, Inc., Homestead Div., Juneau, Wisconsin, 2003.
Lowe's; "Your search for hummingbird feeder returned the following:"; Lowe's (LF LLC). http://www.lowes.com/SearchCatalogDisplay?storeId=10151&lanqId=-1&catalogId=1005 . . . , 2012.
Capri-Sun; "Our Drinks—Product range and nutrition information—Capri-Sun"; 2010. http://capri-sun.co.uk/mums/product-info/index.php.
Nature and Home; "Hummingbird King"; Nature and Home; 2009. http://web.archive.org/web/20100417111928/http://www.natureandhome.com/_product_7 . . . .
Tetra Pak; "The Future of the Stand-up Pouch and The Evolution of Tetra Wedge Aseptic Fiber Pouch Into New Markets"; Tetra Pak Inc, Vernon Hills, IL; Nov. 2004.
Homestead; "Nectar Gem Hummingbird Feeding System"; Gardner Equipment Company; 2008; http://web.archive.org/web/20090401105231/http://www.nectargem.com/.
Homestead; "Laboratory Study"; Gardner Equipment Company; 2009. http://web.archive.org/web/20090401070358/http://www.nectargem.com/study.html.
USPTO Office Action in U.S. Appl. No. 13/092,285, Jun. 11, 2011.
Borden, "Fat Free Skim Milk," Apr. 2011.
amazon.com; Humdinger Hummingbird Feeder, http://www.amazon.com/Humdinger-Hummingbird-Feeder-32oz/dp/B003BG1GRG, accessed Feb. 25, 2014.
Midland Hardware; Classic Brands LLC: 171175 Big Gulp Big Gulp Hummingbird Feeder 41; http://www.midlandhardware.com/171175.html, accessed Feb. 25, 2014.
Barn in the Sticks; Clear Hummingbird Food Easy Mixr; http://www.barninthesticks.com/clearhummingbird-food-easy-mix, accessed Feb. 25, 2014.
Cheer Pack; Innovative Complete Packaging Solutions; http://www.cheerpack.com/index.html, accessed Feb. 3, 2014.
amazon.com—Bird Brain, Happy Hummer on a Stake (Discontinued by Manufacturer); http://www.amazon.com/...Brain-HummerDiscontinuedManufacturer/dp/B002GP5WP0/ref=sr_1_1?s=lawngarden&ie=UTF8&qid=1394637284&sr=1-1&keywords=happy+hummer, accessed Mar. 12, 2014.
Droll Yankees; Happy Eight 2 Hummingbird Feeder; http://www.drollyankees.com/product/happy-eight-2-hummingbird-feeded, accessed Jan. 27, 2014.
The Backyard Bird Company; Hummingbird Nectar Easy-Mix (Clear); http://www.backyardbird.com/Hummingbird-Nectar-Easy-Mix-Clear_p_691.html, accessed Feb. 25, 2014.
Backyard Bird Watcher; 24 oz Clear Hummingbird Nectar Easy Mix.; http://www.backyardbirdwatcher.com/hummingbirdfood.html, accessed Feb. 25, 2014.
The Zen Birdfeeder; "10 Questions for a Migrating Hummingbird" and "FAQ—Do I Have to Boil the Water to Make Hummingbird

(56) References Cited

OTHER PUBLICATIONS

Nectar?"; http://wildbirdsunlimited.typepad.com/the_zen_birdfeeder/responsibility, dated Mar. 6, 2014 accessed on Mar. 18, 2014.

shopwiki.com; Selection of Bird Feeders from Stokes; http://www.shopwiki.com/d/774051/322542083/Stokes-Select-Bird-Feeder-Pole, accessed on Feb. 15, 2014.

Birdola: Hummingbird Nectar 16 oz. Concentrate; http://www.birdola.com/products/hummingbird-products/hummingbird-nectar-16-oz.aspx, accessed May 2014.

Birdola: Hummingbird Nectar Ready to Use; Birdola Products 1650 Broadway NW, Grand Rapids, MI 49504, May 2014.

Amcor: 8 oz. Retortable Paneled Bottle & Closure; http://www.amcor.com/products_services/8oz_Retort_Paneled_PET_bottle.html, indicates Copyright 2014, accessed on Aug. 19, 2014.

Amcor: Amcor Rigid Plastic Stock Bottles, Amcor Rigid Plastics, 935 Technology Drive, Ann Arbor MI 48108, dated Oct. 2013, accessed at http://www.amcor.com/products_services/8oz_Retort_Paneled_PET_bottle.html on Aug. 19, 2014.

syracuse.com; "How hummingbirds 'drink' nectar, a mysterious Lake Michigan fog: Outdoors Oddities," http://www.syracuse.com/outdoors/index.ssf/2014/06/how_hummingbirds_drink_nectar_a_mysterious_lake_michigan_fog_oddities_in_the_out.html, dated Jun. 2, 2014, accessed on Nov. 17, 2015.

dogonews.com; "Hummingbirds Don't Suck Nectar In—They Drink It!", http://www.dogonews.com/2011/5/8/hummingbirds-dont-suck-nectar-in-they-drink-it, dated May 8, 2011, accessed on Nov. 17, 2015.

rodales.com; "3-Tiered Hummingbird Feeder," www_rodales_com_3-tiered-hummingbird-feeder_E004442_html, accessed Mar. 11, 2016.

eznectar.com; "EZ Nectar," www.eznectar.com, accessed via archive.org on Jan. 3, 2017, capture dated May 23, 2015, includes transcript of video and four still frames from video.

\* cited by examiner

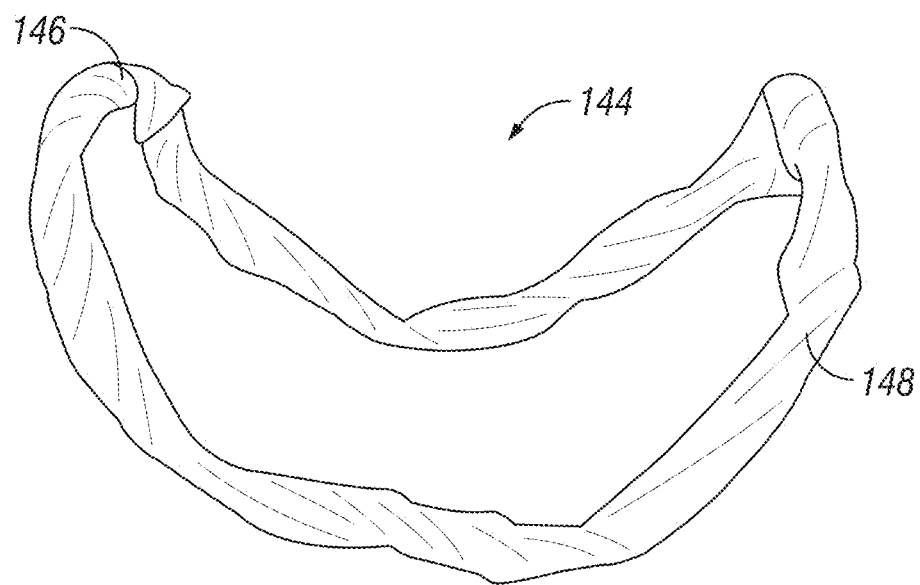
FIG. 10A
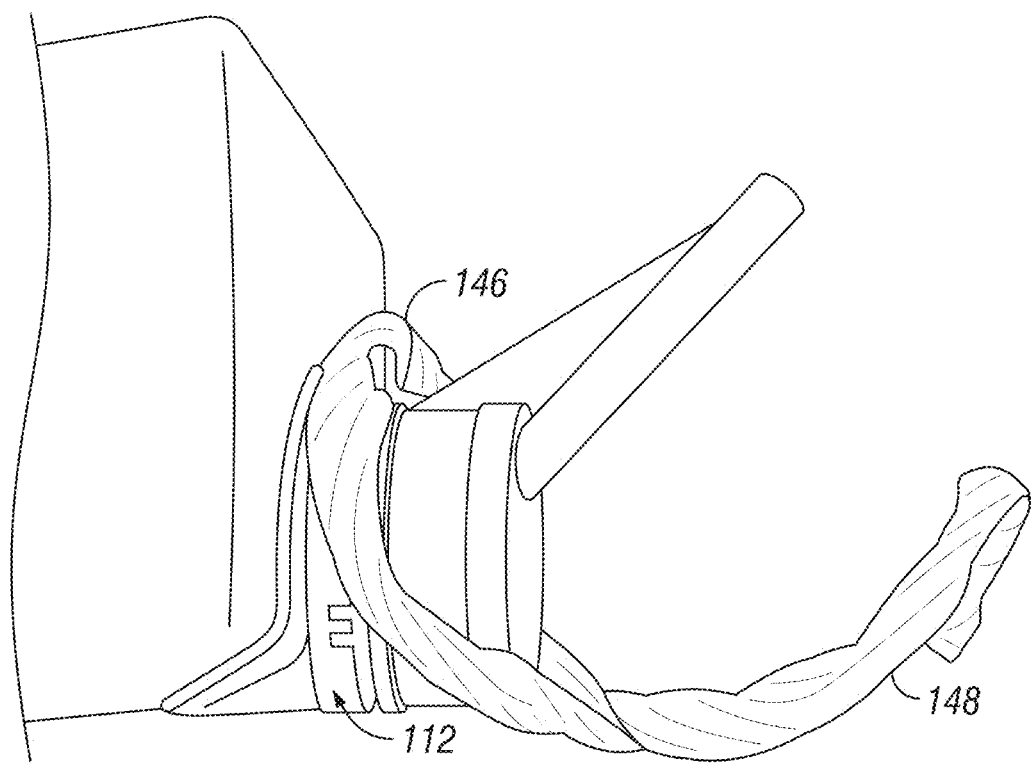

TILTING FEEDER

CROSS-REFERENCE TO RELATED APPLICATIONS

This application is a continuation-in-part of, and claims the benefit of, the pending prior application having Ser. No. 14/455,092 entitled APPARATUS FOR FEEDING BIRDS, filed on Aug. 8, 2014 and will issue as U.S. Pat. No. 9,192,148, the entire contents of which are incorporated herein by reference for all purposes. Prior application Ser. No. 14/455,092 is a continuation of, and claims benefit of the filing date, of U.S. patent application Ser. No. 13/784,392 entitled HUMMINGBIRD FEEDING APPARATUS filed Mar. 4, 2013, now issued as U.S. Pat. No. 8,893,659, which relates to, and claims the benefit of the filing date of, U.S. patent application Ser. No. 13/092,285 entitled HUMMINGBIRD FEEDING APPARATUS, filed Apr. 22, 2011, now issued as U.S. Pat. No. 8,387,567, which relates to, and claims the benefit of the filing date of, U.S. provisional patent application Ser. No. 61/326,736 entitled APPARATUS FOR FEEDING BIRDS, filed Apr. 22, 2010, the entire contents of each which are incorporated herein by reference for all purposes.

BACKGROUND OF THE INVENTION

The present invention relates to feeders for animals, for instance feeders for hummingbirds. Hummingbird feeders are a source of enjoyment for bird and nature enthusiasts. A hummingbird feeder is typically a reservoir that dispenses or makes available a food source to a hummingbird, namely nectar. Nectar typically comprises a sugar and water solution.

Some hummingbird feeders rely on a nozzle positioned below or under a reservoir of liquid hummingbird solution that mimics the nourishment found in nature. The weight of the feeding solution pushes the solution to the access point of the nozzle. The nozzle functions as a valve that should control the gravity-fed flow of feed solution by holding feed solution inside the nozzle until a hummingbird disturbs the nozzle to access the feed solution.

These hummingbird feeders tend to leak due to either the undesired flow from the nozzle, for example due to temperature changes, spoilage of the feed solution, and the wind moving the feeder, among other causes. Also, when a hummingbird disturbs the nozzle, it initiates a flow of feed solution from the feeder that results in the hummingbird releasing more feeding solution than it can ingest. Leakage furthermore attracts unwanted pests, such as ants and wasps that tend to contaminate the feed solution. What is needed are improved feeders for feeding hummingbirds, and other animals.

SUMMARY

The present invention provides animal feeders having and methods providing a reservoir containing a feed solution. A dispensing member is connected to the reservoir for dispensing the feed solution to an animal. The reservoir rotates about a pivot to maintain an opening in the dispensing member above the level of the feed solution in the reservoir as the weight distribution of the feeder changes.

BRIEF DESCRIPTION OF THE DRAWINGS

For a more complete understanding of the present invention and the advantages thereof, reference is now made to the following Detailed Description taken in conjunction with the accompanying drawings, in which:

FIGS. 10A and 10B are a perspective view of a perch and a side view of the perch mounted on a feeder, respectively.

DETAILED DESCRIPTION

In the following discussion, numerous specific details are set forth to provide a thorough understanding of the present invention. However, those skilled in the art will appreciate that the present invention may be practiced without such specific details. Additionally, for the most part, specific details and the like have been omitted inasmuch as such details are not considered necessary to obtain a complete understanding of the present invention, and are considered to be within the understanding of persons of ordinary skill in the relevant art.

Figure 1:
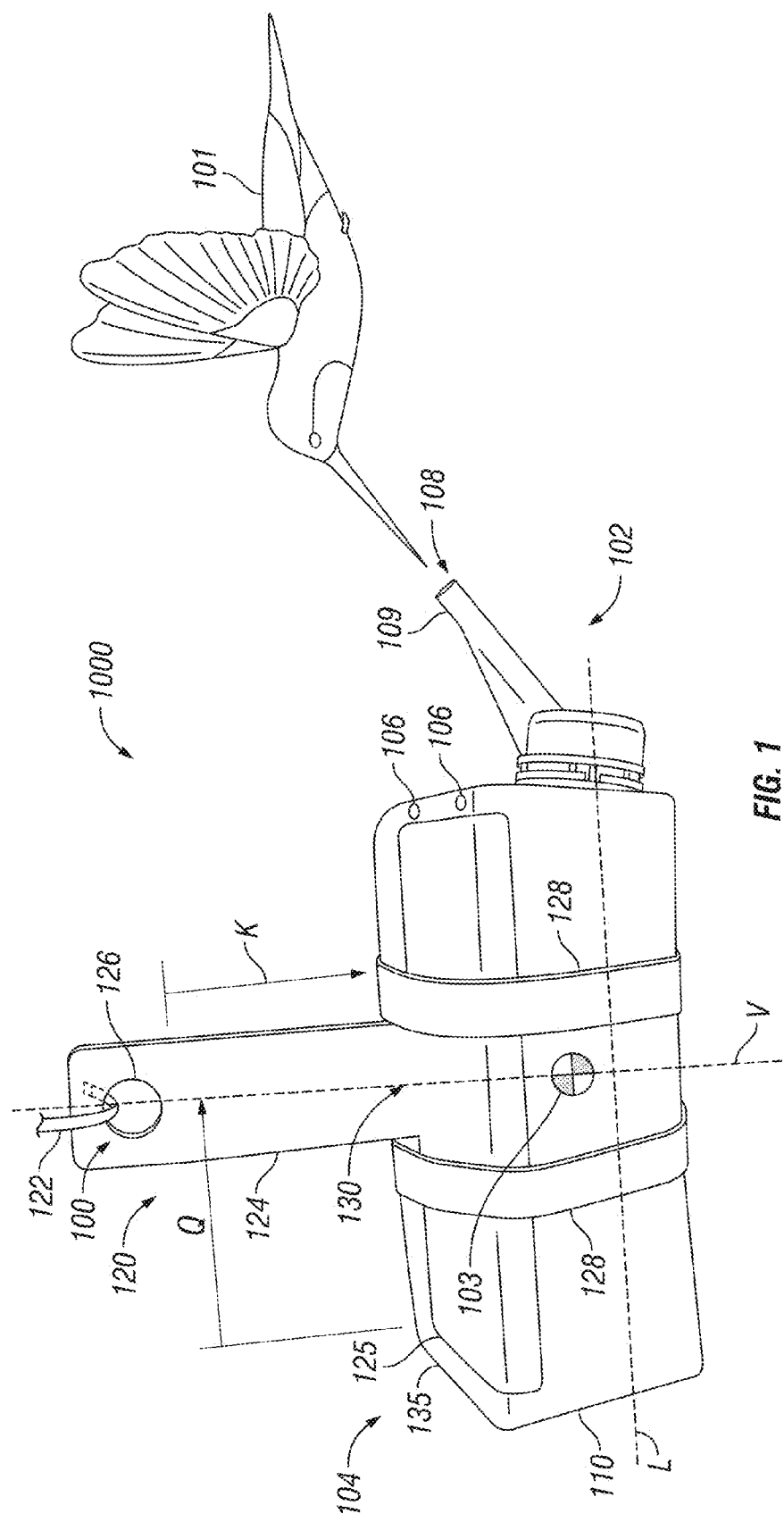
FIG. 1 is a perspective view of a feeder.
Figure 6:
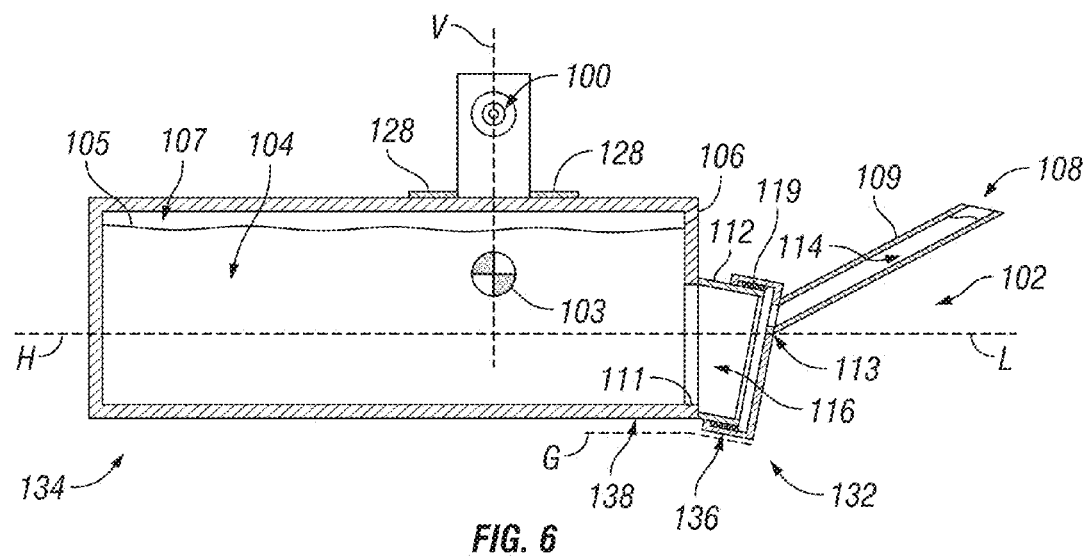
FIG. 6 is an illustration of a first cross-sectional view taken along line A-A, including A' of the feeder shown in FIG. 5.

Referring to FIG. 1, there is shown a first embodiment of a bird feeder 1000 (referred to also as "feeder 1000"). The feeder 1000 may contain a liquid feed solution 105, as shown in FIG. 6, prepared to nourish a bird 101. It will be understood by persons skilled in the field of art of the invention that the feeder 1000 may be configured for feeding other non-human animals, including but not limited to other birds, by providing suitable feed solution for the particular animal.

The feed solution 105 (shown in FIG. 6) may be contained within a reservoir 104. As shown in FIG. 1, the bird 101 may access the feed solution 105 through a dispenser 102, which may comprise a feeding port 109 connected to the reservoir 104. The port 109 may comprise an opening 108 for the bird 101 to stick its bill for accessing the feed solution 105. The reservoir 104 may extend along a first longitudinal axis L.

Figure 5:
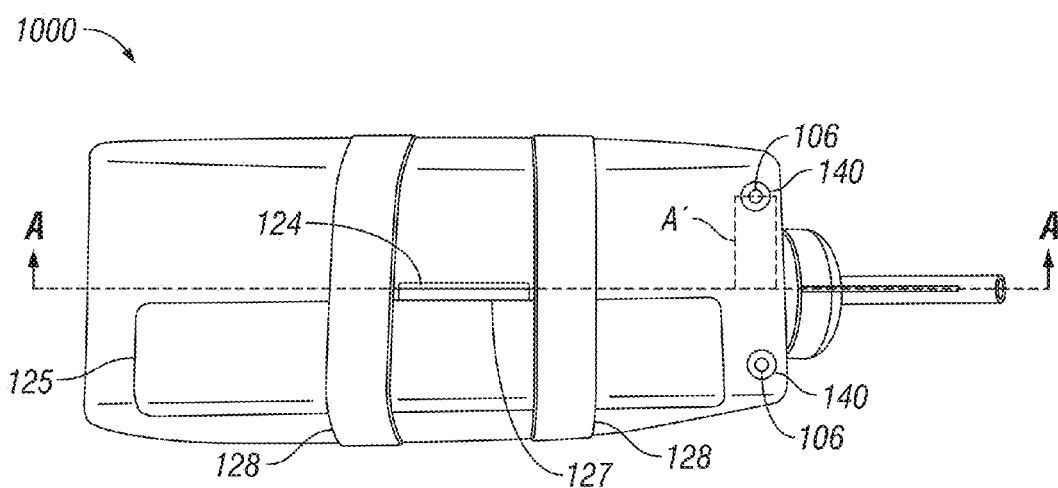
FIG. 5 a top view of a feeder, showing a cross-sectional line A-A, including line segment A', taken across the feeder.

Referring to FIG. 6, the feeder 1000 may rotate on a pivot 100 in at least a first plane A (see FIG. 5 showing first plane A). The dispenser 102 may be connected to the reservoir 104 on a front side 132 of the reservoir 104, which is opposite a back side 134 of the reservoir 102 relative to the pivot 100. "Front," in the context of the reservoir 104, refers to the side of the reservoir 104 connected to the dispenser 102 and "back" refers to the opposite side relative to the pivot 100. The weight of the reservoir 104 extending along the first longitudinal axis L and the dispenser 102 may be balanced on either side of the pivot 100 to provide at least an orientation of the feeder 1000. The orientation of the feeder 1000 may be established by at least the angle B (see FIGS. 7-9) between the first longitudinal axis L and the local horizontal H (shown co-aligned in FIG. 6), which is the direction perpendicular to the local vertical direction V (shown in FIG. 6) upon which gravity acts, and is referred to here as the reservoir tilt angle B.

Figure 7:
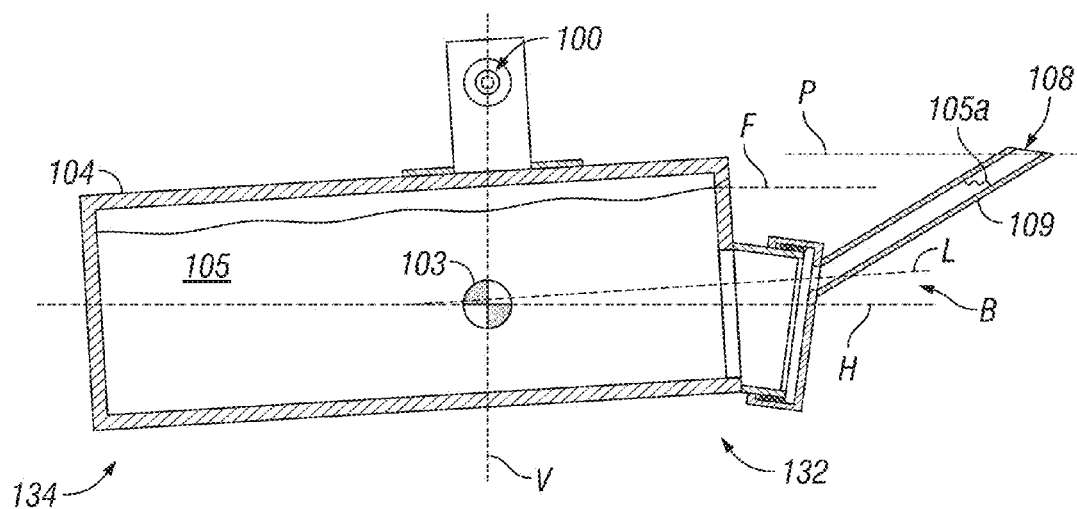
FIG. 7 is the illustration of the cross-sectional view of the feeder of FIG. 6 in a first position.

Referring to FIGS. 1 and 7, the pivot 100 may be configured to allow for rotation of the feeder 1000 and stabilization at a tilt angle B according to a change of weight distribution within the feeder 1000. The change of weight distribution of the feeder 1000 causes a rotation of the feeder 1000 about the pivot 100 to re-balance and stabilize the reservoir 104 from a first orientation to at least a second orientation. Such a change in weight distribution may occur when feed solution 105 exits the reservoir 104 through the feeding port 102.

Referring to FIG. 6, there is shown an illustrative cross-sectional drawing of the feeder 1000 taken along the first plane A shown in FIG. 5. The pivot 100 is located relative to a center of gravity 103 of the feeder 1000 in a manner that affects the orientation of the feeder 1000 relative to the first plane A. When the feeder 1000 is suspended at the pivot 100, the center of gravity 103 is vertically aligned along the vertical line V with the pivot 100 to put the feeder 1000 in a substantially stable position.

When weight in the feeder 1000 is redistributed the position of the center of gravity 103 relative to the pivot 100 changes causing the feeder 1000 to rotate and stabilize in a new orientation. In the embodiment shown in FIG. 7, the center of gravity is vertically aligned along the vertical line V with the pivot 100. This configuration shown in FIG. 7 results in a positive tilt (angle B) in the feeder 1000, where the front side 132 is relatively higher in the local vertical direction V than the back side 134. Positive tilt means that the front side 132 of the feeder 1000 is rotated away from the direction of gravity in the first plane A and above the local horizontal H, and negative tilt means that front of the feeder 1000 is rotated toward the direction of gravity in the first plane A and below the local horizontal H. A positive tilt of the feeder 1000 (at the tilt angle B) raises the opening 108 in the feeder port 109 above the level of the feeding solution 105 in the reservoir 104, which substantially prevents flow or leakage of feeding solution 105 from the opening 108.

I. The Tilting of the Feeder 1000

As the feeder 1000 empties, the center of gravity 103 of the feeder 1000 may migrate down and towards the feeding port 109 as the feeder 1000 re-balances and stabilizes about the pivot 100. This migration causes the feeder 1000 to progressively tilt in a negative direction, which also tips the feeding port 109 in the negative direction.

Referring to FIG. 7, the feeder 1000 is shown in a first orientation. The reservoir 104 is shown substantially full forming a pool of feeding solution 105 which a bird may access through the feeding port 109. The tilt angle B is shown as the angle between the first longitudinal axis L of the reservoir 104 and the local horizontal H and is shown as generally positive relative to the local horizontal H. In the configuration shown, the position of the opening 108, shown by line P, relative to the local vertical V, is at or above the level of the feeding solution, shown by line F.

The progressive tilting in the negative direction allows gravity to push feed solution 105 into the feeding port 109, which keeps feed solution 105 accessible to the bird 101. The opening 108 in the feeding port 109 may be positioned relative to the feeder 1000 such that as the center of gravity 103 migrates, causing a progressively declining tilt angle B (towards a negative tilt), while the opening 108 stays above the level of the feed solution 105 in the reservoir 104.

Figure 8:
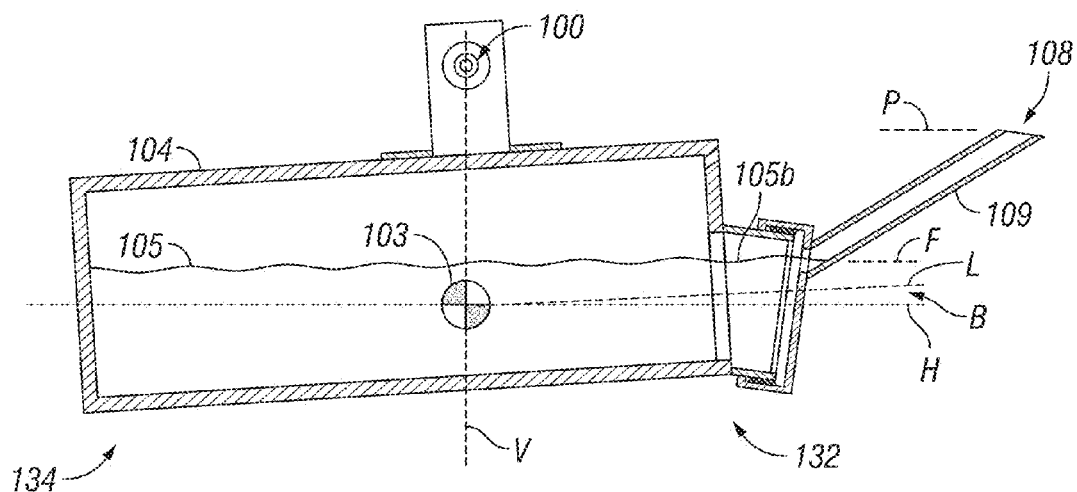
FIG. 8 is the illustration of the cross-sectional view of the feeder of FIG. 6 in a second position.

Referring to FIG. 8, the feeder 1000 is shown in a second orientation. The reservoir 104 is shown as partially full of feed solution 105. The tilt angle B has progressively decreased relative to the tilt angle B shown in FIG. 7, because as the reservoir 104 is emptied, the center of gravity 103 shifted down and toward the feeding port 109, i.e. towards the front side 132 where a greater proportion of the weight of the feeder 1000 is located. The feeder 1000 has rotated to vertically re-align the center of gravity 103 with the pivot 100. As a result, the tilt angle B decreases in the negative direction and is shown as generally positive relative to the local horizontal H, but still less than the tilt angle B of FIG. 7. In the configuration shown, the position of the opening 108, shown by line P, is above the level of the feeding solution 105, shown by line F.

Keeping the opening 108 of the feeding port 109 above the level of the feed solution 105 in the reservoir 104 prevents leakage due to gravity pulling the feed solution 105 out. Also, the bird 101 (shown in FIG. 1) is allowed to take feed solution 105 at its own pace and quantity rather than initiating a flow of feed solution 105 from the feeding port 109, which tends to waste feed solution 105.

Figure 9:
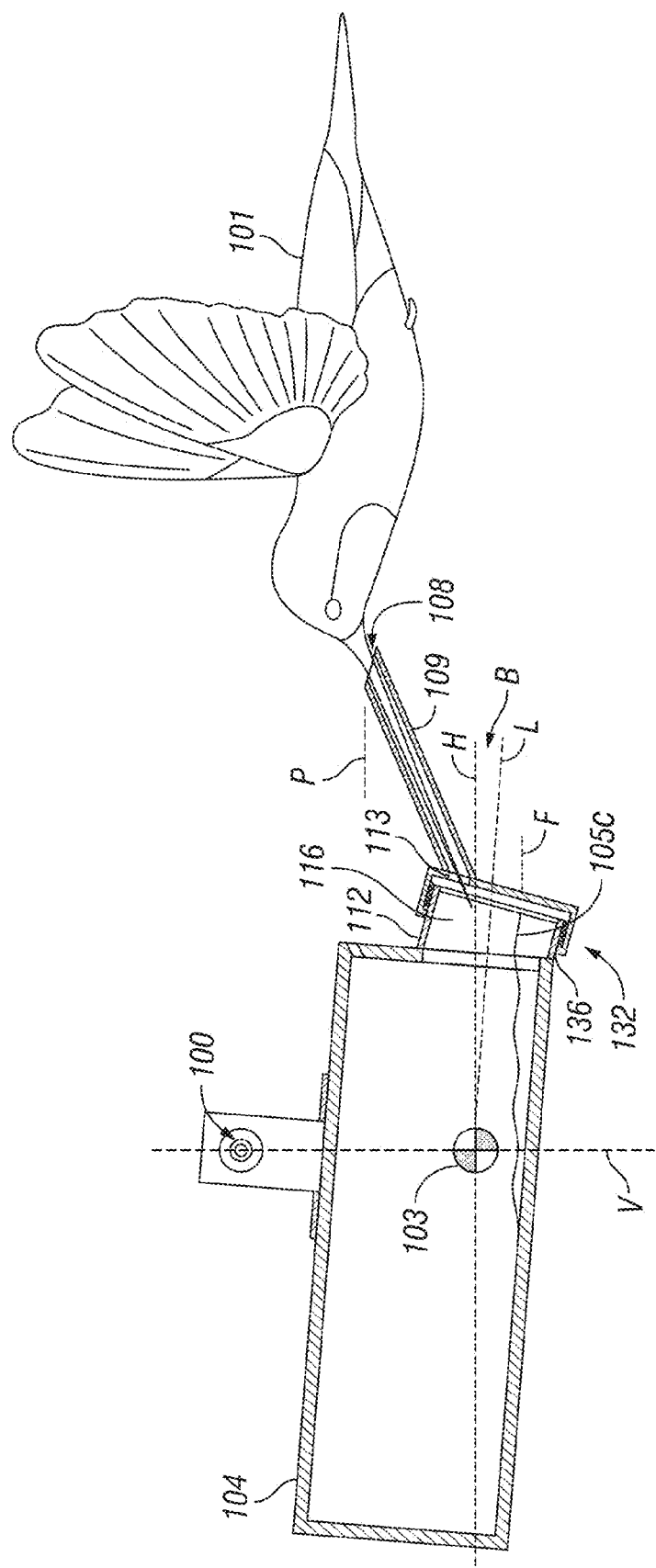
FIG. 9 is the illustration of the cross-sectional view of the feeder of FIG. 6 in a third position.

Referring to FIG. 9, the feeder 1000 is shown in a third position. The reservoir 104 is shown nearly empty of feed solution 105c. The tilt angle B has decreased relative to the tilt B shown in FIG. 8 due to the shifting of the center of gravity 103 towards the front side 132. The feeder 1000 has rotated to vertically re-align the center of gravity 103 with the pivot 100. The tilt angle B has decreased in the negative direction and shown as generally negative relative to the local horizontal H. The negative tilt angle B allows feed solution 105c to flow towards the front of the reservoir 104 so that it pools in the front side 132. In the configuration shown, the vertical position of the opening 108, shown by line P, remains above the level of the feeding solution 105c, shown by line F.

Figure 2:
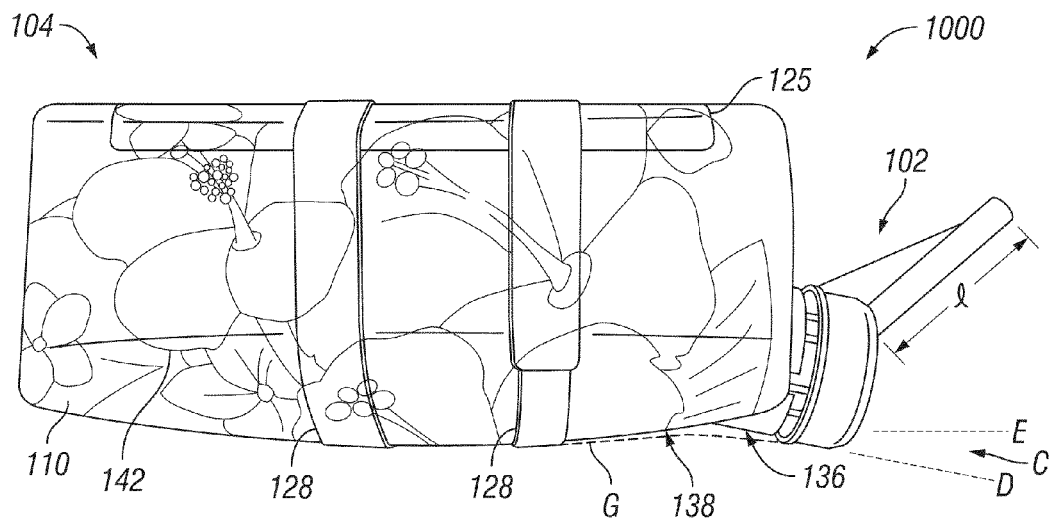
FIG. 2 is a side view of a feeder.

Referring to FIG. 2, the spout 112 may be positioned near or adjacent to the bottom side 138 of the reservoir 104. In the embodiment shown in FIGS. 2 and 6 the bottom side 136 of the spout 112 is substantially contiguous with the bottom side 138 of the reservoir 104, generally following a line G. This configuration provides a reservoir opening 111, shown in FIG. 6, for the flow of feed solution 105 from the reservoir 104 into the spout 112, where the feed solution 105 may pool, during use.

Referring to FIG. 2, the spout 112 may be canted relative to the reservoir 104 by a cant angle C, which is generally the angle between the bottom side 138 (shown by the projection line E) of the reservoir 104 and the direction of cant of the bottom side 136 (shown by the projection line D) of the spout 112. The spout 112 is canted to allow feed solution 105 to pool in a cavity 116 (shown in FIGS. 6 and 9) of the spout 112 near the bottom side 136, for example as shown in FIG. 9 where the reservoir 104 is nearly empty of feed solution 105c. This pooling allows birds to have access to the remaining amount of feed solution 105c, by maintaining the proximity of the beak of the bird to the remaining solution, as the tilt angle B increases in the negative direction.

II. The Vent Holes of the Feeder 1000

Referring now to FIG. 6, as the bird 101 takes feed solution 105 from the reservoir 104 through the feeding port 109 at opening 108, air may enter the reservoir 104 through the opening 108 to balance the pressure between the outside environment and the conditions inside the reservoir 104. Bubbles of air may enter the reservoir 104 and rise to air pockets 107 within the reservoir 104, which form above the level of the feeding solution 105. The air pockets 107 form due to the greater volume of the reservoir 104 compared to the volume of feed solution 105 contained within it. As the reservoir empties of feed solution 105, the volume of air increases until the reservoir 104 is empty of feed solution 105.

When these air pockets 107 get heated, by for example day time heating from the sun, the air within the pocket 107 can expand creating a positive pressure in the air pocket 107 relative to the outside environment. With sufficient heating and expansion, feeding solution 105 may be pushed out from the feeding port 109 to equalize the pressure between the air pockets 107 and the outside environment.

In FIGS. 1, 5 and 6, vent holes 106 extend through the walls 110 of the reservoir 104 to allow for the equalization of pressure in the reservoir 104. The vent holes 106 may prevent leakage of feed solution 105 from the reservoir 104 due to heating of the air pockets 107 in the reservoir 104. The vent holes 106 may be positioned above the level of the pool of feed solution 105 where air pockets 107 are expected to form when the feeder 1000 is oriented in at least a first position, shown in FIG. 7.

The vent holes 106 may be formed by perforating the walls 110 of the reservoir 104. By example, the perforations may be formed by using a punch like a pointed object, e.g. an object similar to a golf tee or a nail having a thickness to provide a suitably sized hole. In the embodiment shown in FIG. 6, vent holes 106 are positioned on an upper surface of the front side 132 of the reservoir 104. This positions the vent hole 106 above where air pockets 107 are expected to form in the reservoir when the reservoir 104 is in the tilted orientations shown in FIGS. 7-9.

The materials forming the walls 110 may be suitably pliable to accept the punch and to allow the surface of the wall to be punctured to form a suitably sized hole in the wall for venting air through the vent holes 106. By example, reservoirs made from materials disclosed in U.S. Pat. Nos. 8,387,567 and 8,893,659 to Hill may be suitable, as well as other suitable materials known by persons ordinarily skilled in the art.

In the embodiment shown in FIG. 5, the external walls 110 may be marked with indicators 140 to provide users with a recommended placement of the vent holes 106. The indicators 140 may be pre-marked on the outside surface of the reservoir 104.

III. The Feeding Solution 105

Referring back to FIG. 6, the reservoir 104 may contain a sterile product, such as a hummingbird feeding solution. In some embodiments, the feeding solution 105 may comprise a mixture of sugar and water prepared to known methods and in suitable relative quantities. The feeding solution 105 may be made without additives, such as preservatives, electrolytes, or colors. In other embodiments, the feeding solution 105 contained in the reservoir 104 may also include additives. It will be understood by persons skilled in the art that electrolytes may function also as a preservative.

IV. The Reservoir 104

Referring back to FIG. 1, the reservoir 104 of the feeder 1000 shown may comprise the walls 110 forming a container for the feed solution 105. The reservoir 104 may comprise a box shape or other suitable container shape.

In some embodiments, the reservoir 104 may comprise an aseptic or sterile enclosure. The walls of the reservoir 104 may comprise a combination of paper, plastic, foil, like aluminum foil, or other suitable materials, such as disclosed in U.S. Pat. Nos. 8,387,567 and 8,893,659 to Hill. In other embodiments, the walls 110 of the reservoir 104 may comprise multi-layer plastics or plastics in combination with metals, which are designed for retort filling, or other suitable materials for holding liquids. In some embodiments, the materials used as walls 110 in the reservoir 104 may be sufficiently pliable and suitable for accepting a manual punch by a user to form the vent holes 106. In other embodiments, the vent holes 106 may be pre-formed at the manufacturing stage, and may be closed with a removable seal that the user removes.

Referring to FIG. 2, the external side of the walls 110 of the reservoir 104 may comprise a color, texture, pattern or other suitable perceptible element 142 that is attractive to birds or other animals for which the feeder 1000 is designed. These perceptible elements 142 may be designed to draw desired animals to the feeder 1000 to enhance the enjoyment of feeding the desired animals. In FIG. 2, the perceptible element 142 of feeder 1000 is a floral pattern, which may include colors like red or yellow, or other combination that attracts the animal. The dispenser 102 and other parts of the feeder 1000 may also include perceptible elements that work in combination with the perceptible elements 142. In other embodiments, the perceptible elements 142 may be designed to deter unwanted animals or other living organisms (e.g. insects, bacteria, etc.) from interfering with use of, consumption of, or access to the feeding solution 105. In other embodiments, the feeder 1000 may include other known decorative elements, i.e. colors, textures or patterns intended to be decorative for the environment that the feeder 1000 is used.

V. The Dispenser 102

Referring to FIGS. 1 and 6, the dispenser 102 may comprise the feeding port 109 connected to a spout 112, which may comprise an open cylindrical structure forming a cavity 116. The feeding port 109 may comprise a dispenser channel 114 formed by an axially-extended structure, such as a tube. The channel 114 is open at a first end at the opening 108 to allow the bird 101 to access the feeding solution 105. The width or diameter of the channel 114 is sufficiently narrow to allow passage of the bill of a bird (or access by another animal for which the feeder 1000 is designed) but to minimize exposure of the pool of feeding solution 105 to the outside environment, including weather and insects, which may prevent premature spoilage and contamination. For hummingbirds, drinking the feeding solution 105 from a narrow tube also mimics drinking nectar from flowers. At a second end, the channel 114 comprises a mouth 113 leading into the reservoir 104. Feed solution 105 in the reservoir 104 may flow through the reservoir opening 111 and into the cavity 116 formed by the spout 112 and into the channel 114.

When the reservoir 104 is sufficiently full or partially full, feed solution 105$a$, shown in FIG. 7, and feed solution 105$b$, shown in FIG. 8, is available in the channel 114 for a bird to access with its bill. As shown in FIG. 9, the bird 101 may access feed solution 105$c$ located in the spout 112 and reservoir 104 through the mouth 113 of the channel 114. It will be understood by persons ordinarily skilled in the art that the dispenser 102 may comprise one or more feeding ports 109 extending from the same spout 112.

As shown in FIGS. 7 and 8, when the feeder 1000 is in use, and during a least a portion of the time that the feeder 1000 is in use, the mouth 113 is at or below the level of the feed solution 105($a$ or $b$) in the reservoir 104. This configuration maintains a hummingbird's access to the feed solution 105($a$ or $b$) during use, when as shown feed solution 105($a$ or $b$) fills the channel up to the level of the feed solution 105($a$ or $b$) in the reservoir 104. As the feeder 1000 empties of the feed solution 105$c$, as shown in FIG. 9, the level of feed solution 105$c$ may drop below the position of the mouth 113. Due to the tilting of the feeder 1000 and the cant C of the spout 112, feed solution 105c pools at the bottom side 138 of the feeder 1000, and in the bottom side 136 of the spout 112.

Figure 3:
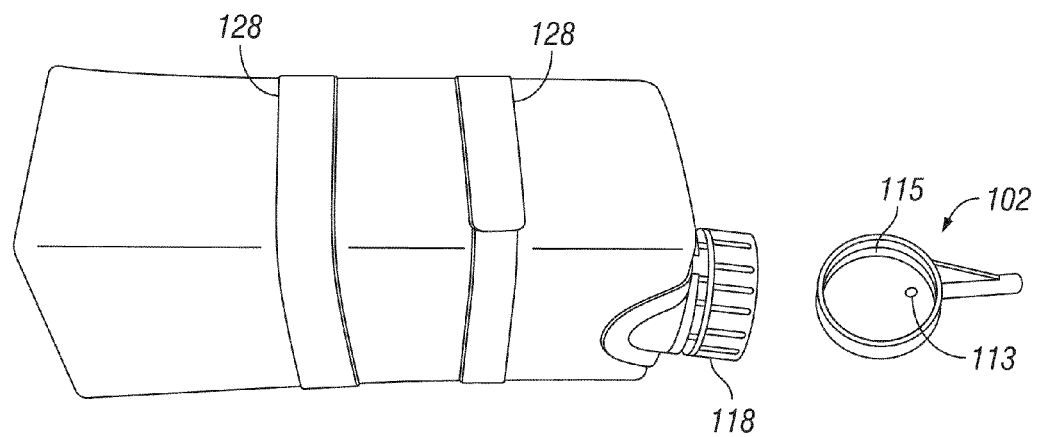
FIG. 3 is a disassembled view of a feeder.
Figure 4:
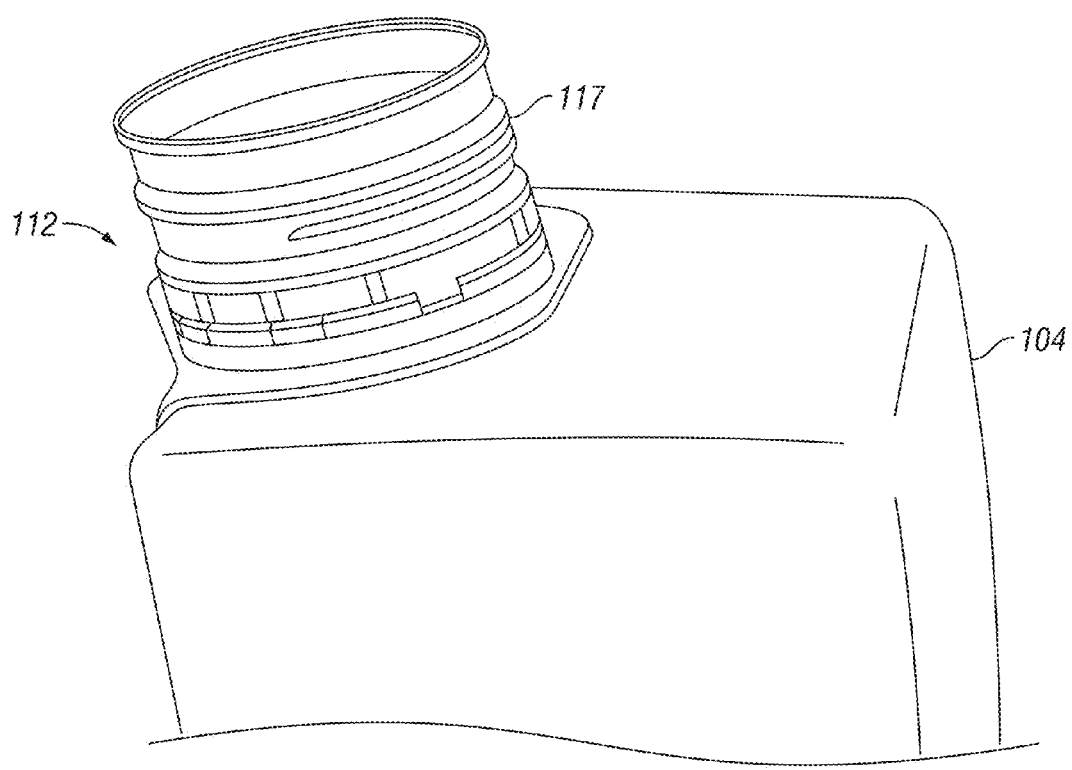
FIG. 4 is a close-view of a spout of a feeder.

The spout 112 may comprise a pipe, tube, or other suitable lip-like projection in the reservoir 104, such as a threaded tube 117, shown in FIG. 4. Referring to FIGS. 3 and 6, the dispenser 102 may comprise threading 115 on an inside surface configured to threadably mate with the threaded tube 117 to form the coupling 119. It will be understood by persons of ordinary skill in the art that the dispenser 102 may be attached to the spout 112 by other suitable attachment means, i.e. snap fits, latches, adhesives, etc.

In some embodiments, as shown in FIG. 3, the spout 112 may be sealed for transport and storage of the reservoir 104 with a cap 118, which may be removed from the spout 112, e.g. by twisting it off, to open the reservoir 104. The dispenser 102 may replace the cap 118 on the spout 112, when the feeder 1000 is ready to be used. The spout 112 may also include other sealing mechanisms, including a breakaway seal (not shown) that works in conjunction with the cap 118 so that upon removal of the cap 118 a portion of the cap 118 breaks the seal to allow feed solution 105 to flow out of the reservoir 104.

Referring to FIG. 2, the length 1 of the spout 112 may be configured to accommodate feeding by a desired animal. For instance, the length of the bill of an adult-sized hummingbird may be about ⅗ to ⅘ of an inch. The length 1 of the spout 112 may be configured at or longer by about 20% of the expected bill length. It will be understood by persons skilled in the art that the length 1 of the spout 112 may be configured to account for a specific species of bird, including their expected tongue length and overall reach. The length 1 may also be configured to account for other accessories used in conjunction with the feeder 1000, including but not limited to perches and insect guards.

VI. The Hanger 120

Referring to FIG. 1, the reservoir 104 may be suspended from a location that is accessible to hummingbirds, other birds, or other animal for which the feeder 1000 is useful. For example, the feeder 1000 may comprise a hanger 120 or other suitable extension configured to receive a hook 122 or other suitable support member and to suspend the reservoir 104 above an underlying surface. In the embodiment shown in FIG. 1, the hanger 120 may comprise a tab portion 124 and a base portion 125 adhered to the reservoir 104. In other embodiments the hanger 120 may comprise other suitable contrivances upon which the feeder 1000 may be hung, including a string, strap, or a rod.

The tab portion 124 may extend from the reservoir 104 have an aperture 126. The aperture 126 may receive the hook 122 to hang the feeder 1000 in a suitable feeding location.

The hanger 120 may be secured to the reservoir 104 by support straps 128 (shown in FIGS. 1, 2, 3, 5, and 6) which hold the base portion 125 to the reservoir 104 and extend around at least a portion of the reservoir 104. The straps 128 support the hanger 120 in manner configured to hold the weight of the feeder 1000 and to withstand environmental forces acting on the feeder 1000, e.g. movement from the wind or from an animal pushing on the feeder 1000 as it feeds. In the embodiment shown, the support straps 128 are attached to the reservoir 104 with a suitable adhesive. In some embodiments, the hanger 120 and support straps 128 are formed in one piece from a single material, such as plastic, while it will be understood by persons of ordinary skill in the art that there may be other variations in the manufacture of the hanger 120 and straps 128, including multi-piece construction.

Referring to FIGS. 1, 5, and 6, at least a portion of the hanger 120 may function as the pivot 100 for allowing the reservoir 104 to progressively tilt in at least the plane A as the reservoir 104 is emptied. In the embodiment shown, the aperture 126 in the tab portion 124 configured to couple to the hook 122 (or other suitable hanging member) to freely hang the feeder 1000 may comprise the pivot 100 about which the feeder 1000 rotates to provide the tilt angle B of the reservoir.

The hanger 120 and reservoir 104 are coupled at connection 130 in manner that allows the hanger 120 and reservoir 104 to rotate jointly relative to the pivot 100. The connection 130 between the hanger 120 and the reservoir 104 allows the reservoir 104 to rotate and stabilize from a first prior orientation to a second subsequent orientation, having a different tilt angle B, as the center of gravity 103 migrates due to the weight shifting. As shown in FIGS. 7 and 8, when the center of gravity 103 changes its position, the feeder 1000 rotates so that the center of gravity 103 vertically re-aligns itself with the pivot 100 into a new stable orientation.

Referring to FIG. 1, the position Q measured relative to the back end 135 of the reservoir 104 where the hanger 120 is mounted to the reservoir 104 along the top surface of the reservoir is selected to provide a positive initial tilt angle B (shown in FIG. 6), and to provide a progressively tilting reservoir 104 in the negative direction. The length K of the tab portion 124 is selected to provide a range of tilt angles that correspond to the fullness of the reservoir 104—the range between a full configuration of the reservoir 104 and an empty configuration. It will be understood by persons skilled in the art that the position Q of the hanger 120 and the length K of the tab portion 124 can be adjusted to accommodate the desired range of tilt angles B.

The hanger 120 may be made from a suitable material, such as plastic, to allow the hanger 120 to support the reservoir 104 in suspension from a hanging member 122 and in rotation about the pivot 100. Referring to FIG. 5, the tab portion 124 may comprise a substantially flat strap with an edge portion 127. The edge portion 127 of the tab portion 124 may be aligned with plane A where the feeder 1000 rotates.

The weight of the reservoir 104 may keep the tab portion taut and in the same orientation relative to the reservoir 104. The tab portion 124 may have sufficient stiffness in the plane A (where the edge portion 127 is aligned) to resist buckling in the orientations provided by rotation of the feeder 1000 from a full configuration to an empty configuration, (e.g. those shown by example in FIGS. 7-9). The interaction of the adhesive connection 130 between the hanger 120 and the reservoir 104 and the orientation of the tab portion 124 relative to the plane A of rotation allows to the reservoir 104 to rotate and stabilize at a new tilt angle B. Persons ordinarily skilled in the art will understand that other suitable materials and attachment methods may be utilized as the hanger 120 to support the reservoir 104 in suspension and to provide the pivot 100.

VII. Accessories

In some embodiments, the feeder 1000 may comprise accessories to further enhance the functionality of the feeder 1000. As shown in FIGS. 10A and 10B, the feeder 1000 may include a perch 144 extending from the spout 112. The perch 144 may comprise a ring portion 146 configured to extend around a portion of the spout 112 to secure (for example by a snug or snap fit) the perch 144 in substantially a fixed orientation relative to the dispenser 102.

The perch 144 may comprise a landing surface 148 for birds to land on and feed from the dispenser 102. The perch 144 may comprise a portion of a loop that extends contiguously from the ring portion 146, and may be constructed from one piece of material, such as molded from plastic. In some embodiments, such as shown in FIG. 10A, the ring portion 146 and the landing surface 148 may comprise a textured or curved surface to improve mounting, gripping, and handling of the perch 144 by users and by birds or other animals. In other embodiments, the surfaces of the perch 144 may be smooth. The perch 144 may comprise a weight that operates with the weight of the walls 110 of the reservoir 104, the spout 112, and the dispenser 102 to tilt the reservoir 104 as it empties of feed solution 105.

Figure 11A:
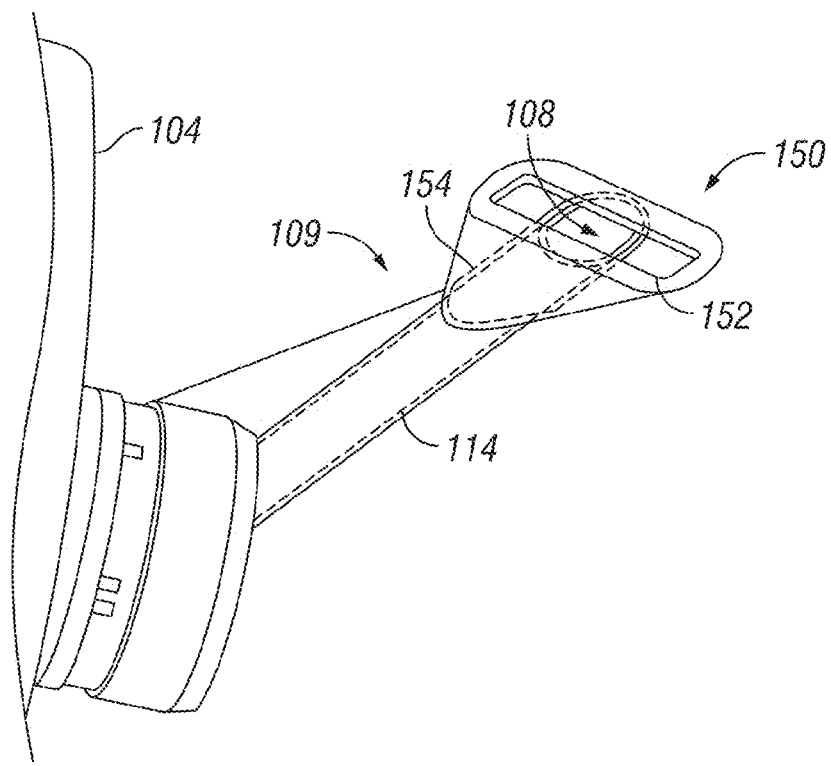
FIGS. 11A and 11B are a perspective view of a cover mounted on a feeder and a top view of the cover, respectively.
Figure 11B:
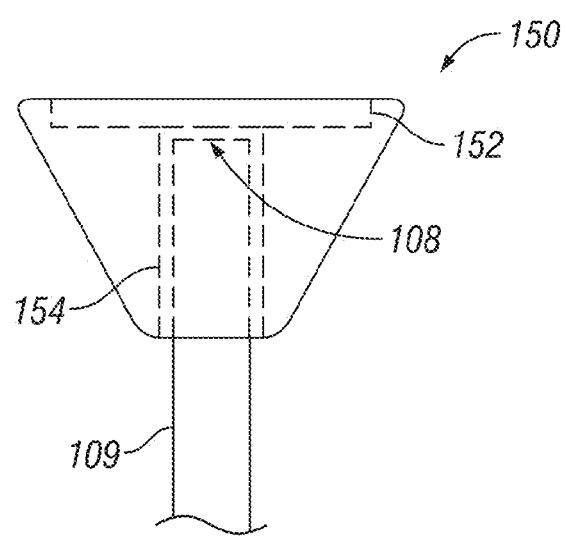

Referring to FIGS. 11A and 11B, the feeder 1000 may include a removable cover 150 that functions as an insect guard. The cover 150 may extend over the opening 108 in the feeding port 109 or the vent holes 106 to prevent insects, such as, but not limited to, bees and wasps from landing on the feeding port 109 to draw feeding solution 105 from the opening 108. The cover 150 may comprise a slot 152 configured with a dimension large enough (such as a width of the slot 152) to allow passage of the beak of a bird into a cover channel 154, but small enough to prevent passage of insects, such as bees and wasps, into the dispenser channel 114.

The cover channel 154 may be configured with a first dimension (such as a width or diameter of the cover channel 154) sufficiently large to allow passage of the cover 150 over at least a portion of the feeding port 109. The cover channel 154 may be also configured with a second dimension (such as a length of the channel 154) configured to allow the slot 152 to be positioned near the opening 109 when the cover 150 is positioned on the feeding port 109. Positioning the slot 152 close to the opening 109 minimizes the amount that the cover 150 extends the distance that a bird must reach in order to access feed solution in the dispenser channel 114 or in the reservoir 104, as the reservoir 104 empties (such as in FIG. 9). It will be understood that other commercially available insect guards may be used or adapted to fit on the feeding port 109 to function in a similar manner to prevent access by insects as the cover 150 disclosed here.

Having thus described the present invention by reference to certain of its embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of embodiments. Accordingly, it is appropriate that the appended claims be construed broadly and in a manner consistent with the scope of the invention.

I claim:

1. An animal feeder comprising:
   a reservoir containing a feed solution for animals;
   a dispenser connected to the reservoir, wherein the dispenser dispenses feed solution from the reservoir through an opening in the dispenser;
   the reservoir further comprises one or more venting holes to allow the exchange of air with the environment outside the reservoir, wherein the venting holes are positioned above the level of feed solution in the reservoir when the animal feeder is in use;
   wherein the opening in the dispensing member is positioned above the level of the feed solution, when the animal feeder is in use;
   wherein, when the animal feeder is in use, the reservoir rotates in at least a first plane from at least a first position to a second position to tilt the reservoir in response to changes in the amount of feed solution in the reservoir, and wherein the rotation from the first position to the second position maintains the opening in the dispensing member above the level of the feed solution; and
   wherein the dispensing member comprises a mouth leading into the reservoir to allow feed solution to flow into the dispenser as the reservoir rotates.

2. The animal feeder of claim 1, wherein the dispensing member comprises a channel between the opening in the dispensing member and the mouth for the flow of feed solution from the reservoir to the opening, and wherein, during at least a portion of the time that the animal feeder is in use, the mouth is positioned at or below the level of the feed solution.

3. The animal feeder of claim 2 further comprising a hanger for suspending the reservoir from a hanging member, wherein suspending the reservoir from a hanging member positions the reservoir in at least the first position for use of the animal feeder.

4. The animal feeder of claim 3, further comprising:
   wherein the reservoir rotates in at least the first plane about a pivot, wherein the pivot comprises an aperture in the hanger, and wherein the hanging member couples to the aperture; and
   wherein the coupling between the aperture and the hanging member is configured to allow rotation of the reservoir about the pivot and stabilization of the reservoir in at least the second position from the first position.

5. The animal feeder of claim 4, wherein the hanger comprises a tab configured to receive the hanging member at a first end and connect to the reservoir at a second end.

6. The animal feeder of claim 5, wherein straps extend around at least a portion of the reservoir to secure the hanger to the reservoir and support the reservoir in suspension.

7. The animal feeder of claim 4, wherein the tab of the hanger comprises a substantially flat strap having an edge portion, and wherein the edge portion is substantially aligned with the first plane of rotation of the reservoir.

8. An animal feeder comprising:
   a means for containing a feed solution for animals;
   a means for dispensing feed solution from the containing means, wherein the dispensing means is connected to the containing means; and
   a means for rotating the reservoir in at least a first plane in response to changes in the amount of feed solution in the reservoir.

9. The animal feeder of claim 8, further comprising:
   a means for exchanging air in the reservoir with the environment outside the reservoir.

10. The animal feeder of claim 8, further comprising:
    wherein the dispensing means comprises a means for accessing the feed solution by an animal;
    wherein the accessing means is positioned above the level of the feed solution;
    wherein the containing means the feed solution rotates from at least a first position to a second position to tilt the containing means in response to changing in the amount of feed solution in the containing means; and wherein the rotation of the containing means from the first position to the second position maintains the accessing means of the dispensing means above the level of the feed solution in the containing means.

11. A method for dispensing a feed solution to animals comprising:
providing a reservoir containing a feed solution for animals, wherein a dispenser connects to the reservoir for dispensing the feed solution from the reservoir to an animal through a first opening in the dispenser and wherein the feed solution in the reservoir flows into the dispenser through a second opening in the dispenser; and
coupling a hanger along an outer surface of the reservoir, wherein the hanger is configured to balance the reservoir in at least a first orientation that positions the opening in the dispenser above the level feed solution in the reservoir.

12. The method of claim 11 further comprising:
wherein the hanger has a length configured to provide a range of orientations of the reservoir, the range of orientations corresponding to the level fullness of the reservoir, and wherein each orientation within the range maintains the opening in the dispensing member above the level of the feed solution.

13. The method of claim 12 further comprising:
rotating the reservoir about a pivot from at least a first plane from at least a first orientation to a second orientation, within the range, to tilt the reservoir in response to changes in the fullness of the reservoir.

14. The method of claim 13, further comprising:
venting the reservoir, provided by venting holes in the reservoir, to allow the exchange of air in the reservoir with the outside environment.

* * * * *